(12) United States Patent
Silverstein et al.

(10) Patent No.: US 8,698,918 B2
(45) Date of Patent: Apr. 15, 2014

(54) AUTOMATIC WHITE BALANCING FOR PHOTOGRAPHY

(75) Inventors: Amnon Silverstein, Palo Alto, CA (US); Brian Cabral, San Jose, CA (US)

(73) Assignee: Nvidia Corporation, Santa Clara, CA (US)

(*) Notice: Subject to any disclaimer, the term of this patent is extended or adjusted under 35 U.S.C. 154(b) by 373 days.

(21) Appl. No.: 12/650,202

(22) Filed: Dec. 30, 2009

(65) Prior Publication Data

US 2011/0096190 A1    Apr. 28, 2011

Related U.S. Application Data

(60) Provisional application No. 61/255,346, filed on Oct. 27, 2009.

(51) Int. Cl.
*H04N 9/73*    (2006.01)

(52) U.S. Cl.
USPC ...................................................... 348/223.1

(58) Field of Classification Search
USPC ............. 348/222.1, 223.1, 224.1, 225.1, 234, 348/235
See application file for complete search history.

(56) References Cited

U.S. PATENT DOCUMENTS

| | | | |
|---|---|---|---|
| 3,904,818 A | 9/1975 | Kovac | |
| 4,253,120 A | 2/1981 | Levine | |
| 4,646,251 A | 2/1987 | Hayes et al. | |
| 4,685,071 A * | 8/1987 | Lee | 382/162 |
| 4,739,495 A | 4/1988 | Levine | |
| 4,771,470 A | 9/1988 | Geiser et al. | |
| 4,920,428 A | 4/1990 | Lin et al. | |
| 4,987,496 A | 1/1991 | Greivenkamp, Jr. | |
| 5,175,430 A | 12/1992 | Enke et al. | |
| 5,261,029 A | 11/1993 | Abi-Ezzi et al. | |
| 5,305,994 A | 4/1994 | Matsui et al. | |
| 5,387,983 A | 2/1995 | Sugiura et al. | |
| 5,475,430 A | 12/1995 | Hamada et al. | |
| 5,513,016 A | 4/1996 | Inoue | |

(Continued)

FOREIGN PATENT DOCUMENTS

| | | |
|---|---|---|
| CN | 1275870 | 12/2000 |
| EP | 0392565 | 10/1990 |

(Continued)

OTHER PUBLICATIONS

"A Pipelined Architecture for Real-Time orrection of Barrel Distortion in Wide-Angle Camera Images", Hau, T. Ngo, Student Member, IEEE and Vijayan K. Asari, Senior Member IEEE, IEEE Transaction on Circuits and Sytstems for Video Technology: vol. 15 No. 3 Mar. 2005 pp. 436-444.

(Continued)

*Primary Examiner* — Nicholas Giles

(57) ABSTRACT

Embodiments of the claimed subject matter are directed to methods for automatic white balancing in an image-capture device. In one embodiment, given an estimated illuminant color (e.g., derived from the Gray World method), a more optimal illuminant color can be found by projecting this point to a plot of common illuminants to determine the closest point on the plot of common illuminants. Once the closest point of the plot of common illuminants is derived, the actual image (e.g., pixel) data of the scene is adjusted by the value of the closest point on the plot of common illuminants so that the light is normalized for the scene.

20 Claims, 9 Drawing Sheets

(56) References Cited

U.S. PATENT DOCUMENTS

| | | | |
|---|---|---|---|
| 5,608,824 A | 3/1997 | Shimizu et al. | |
| 5,652,621 A | 7/1997 | Adams, Jr. et al. | |
| 5,793,433 A | 8/1998 | Kim et al. | |
| 5,878,174 A | 3/1999 | Stewart et al. | |
| 5,903,273 A | 5/1999 | Mochizuki et al. | |
| 5,905,530 A | 5/1999 | Yokota et al. | |
| 5,995,109 A | 11/1999 | Goel et al. | |
| 6,016,474 A | 1/2000 | Kim et al. | |
| 6,078,331 A | 6/2000 | Pulli et al. | |
| 6,111,988 A | 8/2000 | Horowitz et al. | |
| 6,118,547 A | 9/2000 | Tanioka | |
| 6,141,740 A | 10/2000 | Mahalingaiah et al. | |
| 6,151,457 A | 11/2000 | Kawamoto | |
| 6,175,430 B1 | 1/2001 | Ito | |
| 6,252,611 B1 | 6/2001 | Kondo | |
| 6,256,038 B1 | 7/2001 | Krishnamurthy | |
| 6,281,931 B1 | 8/2001 | Tsao et al. | |
| 6,289,103 B1 | 9/2001 | Sako et al. | |
| 6,314,493 B1 | 11/2001 | Luick | |
| 6,319,682 B1 | 11/2001 | Hochman | |
| 6,323,934 B1 | 11/2001 | Enomoto | |
| 6,392,216 B1 | 5/2002 | Peng-Tan | |
| 6,396,397 B1 | 5/2002 | Bos et al. | |
| 6,438,664 B1 | 8/2002 | McGrath et al. | |
| 6,486,971 B1 | 11/2002 | Kawamoto | |
| 6,504,952 B1 * | 1/2003 | Takemura et al. | 382/167 |
| 6,584,202 B1 | 6/2003 | Montag et al. | |
| 6,594,388 B1 * | 7/2003 | Gindele et al. | 382/167 |
| 6,683,643 B1 | 1/2004 | Takayama et al. | |
| 6,707,452 B1 | 3/2004 | Veach | |
| 6,724,423 B1 | 4/2004 | Sudo | |
| 6,724,932 B1 | 4/2004 | Ito | |
| 6,737,625 B2 | 5/2004 | Baharav et al. | |
| 6,760,080 B1 | 7/2004 | Moddel et al. | |
| 6,785,814 B1 | 8/2004 | Usami et al. | |
| 6,806,452 B2 | 10/2004 | Bos et al. | |
| 6,839,062 B2 | 1/2005 | Aronson et al. | |
| 6,856,441 B2 | 2/2005 | Zhang et al. | |
| 6,891,543 B2 | 5/2005 | Wyatt | |
| 6,900,836 B2 | 5/2005 | Hamilton, Jr. | |
| 6,950,099 B2 | 9/2005 | Stollnitz et al. | |
| 7,009,639 B1 | 3/2006 | Une et al. | |
| 7,015,909 B1 | 3/2006 | Morgan, III et al. | |
| 7,023,479 B2 | 4/2006 | Hiramatsu et al. | |
| 7,088,388 B2 | 8/2006 | MacLean et al. | |
| 7,092,018 B1 | 8/2006 | Watanabe | |
| 7,106,368 B2 | 9/2006 | Daiku et al. | |
| 7,133,041 B2 | 11/2006 | Kaufman et al. | |
| 7,133,072 B2 | 11/2006 | Harada | |
| 7,146,041 B2 * | 12/2006 | Takahashi | 382/167 |
| 7,221,779 B2 | 5/2007 | Kawakami et al. | |
| 7,227,586 B2 * | 6/2007 | Finlayson et al. | 348/655 |
| 7,245,319 B1 | 7/2007 | Enomoto | |
| 7,305,148 B2 | 12/2007 | Spampinato et al. | |
| 7,343,040 B2 | 3/2008 | Chanas et al. | |
| 7,486,844 B2 | 2/2009 | Chang et al. | |
| 7,502,505 B2 | 3/2009 | Malvar et al. | |
| 7,580,070 B2 | 8/2009 | Yanof et al. | |
| 7,626,612 B2 | 12/2009 | John et al. | |
| 7,627,193 B2 | 12/2009 | Alon et al. | |
| 7,671,910 B2 | 3/2010 | Lee | |
| 7,728,880 B2 * | 6/2010 | Hung et al. | 348/223.1 |
| 7,750,956 B2 | 7/2010 | Wloka | |
| 7,817,187 B2 | 10/2010 | Silsby et al. | |
| 7,859,568 B2 | 12/2010 | Shimano et al. | |
| 7,860,382 B2 | 12/2010 | Grip | |
| 7,912,279 B2 * | 3/2011 | Hsu et al. | 382/162 |
| 8,049,789 B2 * | 11/2011 | Innocent | 348/223.1 |
| 8,238,695 B1 | 8/2012 | Davey et al. | |
| 2001/0001234 A1 | 5/2001 | Addy et al. | |
| 2001/0012113 A1 | 8/2001 | Yoshizawa et al. | |
| 2001/0012127 A1 | 8/2001 | Fukuda et al. | |
| 2001/0015821 A1 | 8/2001 | Namizuka et al. | |
| 2001/0019429 A1 | 9/2001 | Oteki et al. | |
| 2001/0021278 A1 | 9/2001 | Fukuda et al. | |
| 2001/0033410 A1 | 10/2001 | Helsel et al. | |
| 2001/0050778 A1 | 12/2001 | Fukuda et al. | |
| 2001/0054126 A1 | 12/2001 | Fukuda et al. | |
| 2002/0012131 A1 | 1/2002 | Oteki et al. | |
| 2002/0015111 A1 | 2/2002 | Harada | |
| 2002/0018244 A1 | 2/2002 | Namizuka et al. | |
| 2002/0027670 A1 | 3/2002 | Takahashi et al. | |
| 2002/0033887 A1 | 3/2002 | Hieda et al. | |
| 2002/0041383 A1 | 4/2002 | Lewis, Jr. et al. | |
| 2002/0044778 A1 | 4/2002 | Suzuki | |
| 2002/0054374 A1 | 5/2002 | Inoue et al. | |
| 2002/0063802 A1 | 5/2002 | Gullichsen et al. | |
| 2002/0105579 A1 | 8/2002 | Levine et al. | |
| 2002/0126210 A1 | 9/2002 | Shinohara et al. | |
| 2002/0146136 A1 | 10/2002 | Carter, Jr. | |
| 2002/0149683 A1 | 10/2002 | Post | |
| 2002/0158971 A1 | 10/2002 | Daiku et al. | |
| 2002/0167202 A1 | 11/2002 | Pfalzgraf | |
| 2002/0167602 A1 | 11/2002 | Nguyen | |
| 2002/0191694 A1 | 12/2002 | Ohyama et al. | |
| 2002/0196470 A1 | 12/2002 | Kawamoto et al. | |
| 2003/0035100 A1 | 2/2003 | Dimsdale et al. | |
| 2003/0067461 A1 | 4/2003 | Fletcher et al. | |
| 2003/0122825 A1 | 7/2003 | Kawamoto | |
| 2003/0142222 A1 * | 7/2003 | Hordley | 348/223.1 |
| 2003/0146975 A1 | 8/2003 | Joung et al. | |
| 2003/0169353 A1 | 9/2003 | Keshet et al. | |
| 2003/0169918 A1 | 9/2003 | Sogawa | |
| 2003/0197701 A1 | 10/2003 | Teodosiadis et al. | |
| 2003/0218672 A1 | 11/2003 | Zhang et al. | |
| 2003/0222995 A1 | 12/2003 | Kaplinsky et al. | |
| 2003/0223007 A1 | 12/2003 | Takane | |
| 2004/0001061 A1 | 1/2004 | Stollnitz et al. | |
| 2004/0001234 A1 | 1/2004 | Curry et al. | |
| 2004/0032516 A1 | 2/2004 | Kakarala | |
| 2004/0066970 A1 | 4/2004 | Matsugu | |
| 2004/0100588 A1 | 5/2004 | Hartson et al. | |
| 2004/0101313 A1 | 5/2004 | Akiyama | |
| 2004/0109069 A1 | 6/2004 | Kaplinsky et al. | |
| 2004/0189875 A1 | 9/2004 | Zhai et al. | |
| 2004/0218071 A1 | 11/2004 | Chauville et al. | |
| 2004/0247196 A1 | 12/2004 | Chanas et al. | |
| 2005/0007378 A1 | 1/2005 | Grove | |
| 2005/0007477 A1 | 1/2005 | Ahiska | |
| 2005/0030395 A1 | 2/2005 | Hattori | |
| 2005/0046704 A1 | 3/2005 | Kinoshita | |
| 2005/0099418 A1 | 5/2005 | Cabral et al. | |
| 2005/0175257 A1 | 8/2005 | Kuroki | |
| 2005/0185058 A1 | 8/2005 | Sablak | |
| 2005/0238225 A1 | 10/2005 | Jo et al. | |
| 2005/0243181 A1 | 11/2005 | Castello et al. | |
| 2005/0248671 A1 | 11/2005 | Schweng | |
| 2005/0261849 A1 | 11/2005 | Kochi et al. | |
| 2005/0286097 A1 * | 12/2005 | Hung et al. | 358/509 |
| 2006/0050158 A1 | 3/2006 | Irie | |
| 2006/0061658 A1 | 3/2006 | Faulkner et al. | |
| 2006/0087509 A1 | 4/2006 | Ebert et al. | |
| 2006/0119710 A1 | 6/2006 | Ben-Ezra et al. | |
| 2006/0133697 A1 | 6/2006 | Uvarov et al. | |
| 2006/0176375 A1 | 8/2006 | Hwang et al. | |
| 2006/0197664 A1 | 9/2006 | Zhang et al. | |
| 2006/0274171 A1 | 12/2006 | Wang | |
| 2006/0290794 A1 | 12/2006 | Bergman et al. | |
| 2006/0293089 A1 | 12/2006 | Herberger et al. | |
| 2007/0091188 A1 | 4/2007 | Chen et al. | |
| 2007/0147706 A1 | 6/2007 | Sasaki et al. | |
| 2007/0171288 A1 | 7/2007 | Inoue et al. | |
| 2007/0236770 A1 | 10/2007 | Doherty et al. | |
| 2007/0247532 A1 | 10/2007 | Sasaki | |
| 2007/0285530 A1 * | 12/2007 | Kim et al. | 348/223.1 |
| 2008/0030587 A1 | 2/2008 | Helbing | |
| 2008/0062164 A1 | 3/2008 | Bassi et al. | |
| 2008/0101690 A1 * | 5/2008 | Hsu et al. | 382/162 |
| 2008/0143844 A1 * | 6/2008 | Innocent | 348/223.1 |
| 2008/0231726 A1 | 9/2008 | John | |
| 2009/0002517 A1 | 1/2009 | Yokomitsu et al. | |
| 2009/0010539 A1 | 1/2009 | Guarnera et al. | |
| 2009/0116750 A1 | 5/2009 | Lee et al. | |

(56) References Cited

U.S. PATENT DOCUMENTS

| | | |
|---|---|---|
| 2009/0160957 A1 | 6/2009 | Deng et al. |
| 2009/0257677 A1 | 10/2009 | Cabral et al. |
| 2010/0266201 A1 | 10/2010 | Cabral et al. |

FOREIGN PATENT DOCUMENTS

| | | |
|---|---|---|
| EP | 1449169 | 5/2003 |
| EP | 1378790 | 7/2004 |
| EP | 1447977 | 8/2004 |
| EP | 1550980 | 7/2005 |
| GB | 2045026 | 10/1980 |
| GB | 2363018 | 5/2001 |
| JP | 61187467 | 8/1986 |
| JP | 62151978 | 7/1987 |
| JP | 07015631 | 1/1995 |
| JP | 8036640 | 2/1996 |
| JP | 08079622 | 3/1996 |
| JP | 2001052194 | 2/2001 |
| JP | 2002207242 | 7/2002 |
| JP | 2003085542 | 3/2003 |
| JP | 2004221838 | 8/2004 |
| JP | 2005094048 | 4/2005 |
| JP | 2005182785 | 7/2005 |
| JP | 2005520442 | 7/2005 |
| JP | 2006025005 | 1/2006 |
| JP | 2006086822 | 3/2006 |
| JP | 2006094494 | 4/2006 |
| JP | 2006121612 | 5/2006 |
| JP | 2006134157 | 5/2006 |
| JP | 2007019959 | 1/2007 |
| JP | 2007148500 | 6/2007 |
| JP | 2007233833 | 9/2007 |
| JP | 2007282158 | 10/2007 |
| JP | 2008085388 | 4/2008 |
| JP | 2008277926 | 11/2008 |
| JP | 2009021962 | 1/2009 |
| KR | 1020040043156 | 5/2004 |
| KR | 1020060068497 | 6/2006 |
| KR | 1020070004202 | 1/2007 |
| WO | 03043308 | 5/2003 |
| WO | 2004063989 | 7/2004 |
| WO | 2007056459 | 5/2007 |
| WO | 2007093864 | 8/2007 |

OTHER PUBLICATIONS

"Calibration and removal of lateral chromatic abberation in images" Mallon, et al. Science Direct Copyright 2006; 11 pages.
"Method of Color Interpolation in a Singe Sensor Color Camera Using Green Channel Seperation" Weerasighe, et al Visual Information Processing Lab, Motorola Austrailian Research Center pp. IV-3233-IV3236, 2002.
D. Doo, M. Sabin "Behaviour of recrusive division surfaces near extraordinary points"; September; Computer Aided Design; vol. 10, pp. 356-360, 1978.
D.W.H. Doo; "A subdivision algorithm for smoothing down irregular shaped polyhedrons"; 1978; Interactive Techniques in Computer Aided Design; pp. 157-165.
Davis, J., Marschner, S., Garr, M., Levoy, M., Filling holes in complex surfaces using volumetric diffusion, Dec. 2001, Stanford University, pp. 1-9.
Donald D. Spencer, "Illustrated Computer Graphics Dictionary", 1993, Camelot Publishing Company, p. 272.
Duca et al., "A Relational Debugging Engine for Graphics Pipeline, International Conference on Computer Graphics and Interactive Techniques", ACM SIGGRAPH Jul. 2005, pp. 453-463.
E. Catmull, J. Clark, "recursively enerated B-Spline surfaces on arbitrary topological meshes"; Nov. 1978; Computer aided design; vol. 10; pp. 350-355.
gDEBugger, graphicRemedy, http://www.gremedy.com, Aug. 8, 2006, pp. 1-18.
http://en.wikipedia.org/wiki/Bayer_filter; "Bayer Filter"; Wikipedia, the free encyclopedia; pp. 1-4, May 14, 2010.
http://en.wikipedia.org/wiki/Color_filter_array; "Color Filter Array"; Wikipedia, the free encyclopedia; pp. 1-5, May 17, 2010.
http://en.wikipedia.org/wiki/Color_space; "Color Space"; Wikipedia, the free encyclopedia; pp. 1-4, May 14, 2010.
http://en.wikipedia.org/wiki/Color_translation; "Color Management"; Wikipedia, the free encyclopedia; pp. 1-4, May 14, 2010.
http://en.wikipedia.org/wiki/Demosaicing; "Demosaicing"; Wikipedia, the free encyclopedia; pp. 1-5, May 13, 2010.
http://en.wikipedia.org/wiki/Half_tone; "Halftone"; Wikipedia, the free encyclopedia; pp. 1-5, May 13, 2010.
http://en.wikipedia.org/wiki/L*a*b*; "Lab Color Space"; Wikipedia, the free encyclopedia; pp. 1-4, May 13, 2010.
http://Slashdot.org/articles/07/09/06/1431217.html, Oct. 1, 2007.
http:englishrussia.com/?p=1377, Oct. 1, 2007.
J. Bolz, R Schroder; "rapid evaluation of catmull-clark subdivision surfaces"; Web 3D, 2002.
J. Stam; "Exact Evaluation of Catmull-clark subdivision surfaces at arbitrary parameter values"; Jul. 1998; Computer Graphics; vol. 32; pp. 395-404.
Keith R. Slavin; Application as Filed entitled "Efficient Method for Reducing Noise and Blur in a Composite Still Image From a Rolling Shutter Camera"; U.S. Appl. No. 12/069,669, filed Feb. 11, 2008.
Ko et al., "Fast Digital Image Stabilizer Based on Gray-Coded Bit-Plane Matching", IEEE Transactions on Consumer Electronics, vol. 45, No. 3, pp. 598-603, Aug. 1999.
Ko, et al., "Digital Image Stabilizing Algorithms Basd on Bit-Plane Matching", IEEE Transactions on Consumer Electronics, vol. 44, No. 3, pp. 617-622, Aug. 1998.
Krus, M., Bourdot, P., Osorio, A., Guisnel, F., Thibault, G., Adaptive tessellation of connected primitives for interactive walkthroughs in complex industrial virtual environments, Jun. 1999, Proceedings of the Eurographics workshop, pp. 1-10.
Kumar, S., Manocha, D., Interactive display of large scale trimmed NURBS models, 1994, University of North Carolina at Chapel Hill, Technical Report, p. 1-36.
Kuno et al. "New Interpolation Method Using Discriminated Color Correlation for Digital Still Cameras" IEEE Transac. On Consumer Electronics, vol. 45, No. 1, Feb. 1999, pp. 259-267.
Loop, C., DeRose, T., Generalized B-Spline surfaces o arbitrary topology, Aug. 1990, SIGRAPH 90, pp. 347-356.
M. Halstead, M. Kass, T. DeRose; "efficient, fair interolation using catmull-clark surfaces"; Sep. 1993; Computer Graphics and Interactive Techniques, Proc; pp. 35-44.
Morimoto et al., "Fast Electronic Digital Image Stabilization for Off-Road Navigation", Computer Vision Laboratory, Center for Automated Research University of Maryland, Real-Time Imaging, vol. 2, pp. 285-296, 1996.
Paik et al., "An Adaptive Motion Decision system for Digital Image Stabilizer Based on Edge Pattern Matching", IEEE Transactions on Consumer Electronics, vol. 38, No. 3, pp. 607-616, Aug. 1992.
Parhami, Computer Arithmetic, Oxford University Press, Jun. 2000, pp. 413-418.
S. Erturk, "Digital Image Stabilization with Sub-Image Phase Correlation Based Global Motion Estimation", IEEE Transactions on Consumer Electronics, vol. 49, No. 4, pp. 1320-1325, Nov. 2003.
S. Erturk, "Real-Time Digital Image Stabilization Using Kalman Filters", http://www,ideallibrary.com, Real-Time Imaging 8, pp. 317-328, 2002.
T. DeRose, M., Kass, T. Troung; "subdivision surfaces in character animation"; Jul. 1998; Computer Graphics and Interactive Techniques, Proc; pp. 85-94.
Takeuchi, S., Kanai, T., Suzuki, H., Shimada, K., Kimura, F., Subdivision surface fitting with QEM-basd mesh simplificatio and reconstruction of aproximated B-Spline surfaces, Eighth Pacific Conference on computer graphics and applications pp. 202-2012, 2000.
Uomori et al., "Automatic Image Stabilizing System by Full-Digital Signal Processing", vol. 36, No. 3, pp. 510-519, Aug. 1990.
Uomori et al., "Electronic Image Stabiliztion System for Video Cameras and VCRS", J. Soc. Motion Pict. Telev. Eng., vol. 101, pp. 66-75, 1992.

* cited by examiner

AUTOMATIC WHITE BALANCING FOR PHOTOGRAPHY

CLAIM OF PRIORITY

This application claims priority to the provisional patent application entitled, "Automatic White Balance for Photograph," filed Oct. 27, 2009, application Ser. No. 61/255,346.

BACKGROUND

When an imaging device such as a camera takes pictures under one or more sources of light, the image will have a color bias depending on the color and temperature of the specific source(s) of light. For example, under light generated from a tungsten source, un-modified pictures will have an overall yellowish-orange cast. Under natural lighting during twilight however, images will often have a very bluish cast. In order to mitigate the potentially heavy color biasing that occurs under varying light conditions, adjustments are typically performed either internally within the device or during the processing phase to balance the light so that the resulting images appear relatively normalized to the human eye.

According to contemporary photographic techniques, each pixel in a scene or image can be represented as a vector with one dimension for each of a multitude of color channels. For example, in a three color image, each pixel can be represented as a three dimensional vector (e.g., typically the vector [R,G, B]). This vector can be projected down to a lower dimensional space, such as by transforming it to a luminance/chrominance color space such as YUV coordinates. The YUV pixel can then be represented by just its color terms as a two dimensional vector [u,v]. In a two dimensional space, the color of common illuminants will have a distribution that falls mostly along a curve in color space. Plankian illuminants (ideal blackbody radiators) have a color of light that vary with one dimension, the temperature color. The temperature colors form a smooth curve in color space. Many common lamps radiate colors that are similar to Plankian illuminants, so they tend to fall along this curve. The curve ranges from blue (high temperatures) to red (low temperatures).

There exist several approaches to automatic white balancing. In several conventional approaches, characteristics of an image (e.g., attributes of the pixels comprising the image) are used to estimate the color of the illumination. This illumination, represented as a value, is subsequently factored out of the pixel colors. A popular method is known as the "Gray World" approach. According to the Gray World method, the color values corresponding to pixels of an image are averaged and the average color of the image is used as the estimated color of the illuminant (and thus, removed). Factors of scale on each color channel are chosen so that the average color, after scaling is performed, results in a neutral color value.

Unfortunately, the estimated illuminant color derived from the average of the pixel values is sub-optimal for the purposes of normalization. In certain circumstances, the estimated illuminant color can be a highly unlikely color for an illuminant and factoring the illuminant color out of the image will result in images with distorted coloring. For example, in scenes with mostly green foliage, the average color value will be a value that approximates some shade of green. According to the Gray World model, the illuminant will be estimated as a green light and will be subsequently factored out of the image, thus resulting in foliage that appears neutral, i.e., gray, adversely affecting the appearance of the image.

Another problem with the Gray World method is that large colored surfaces can bias the estimate for the entire scene or image. For example, in scenes that are comprised by large portions of blue sky, the gray world technique will over bias the illuminant color as blue. After the blue illumination is factored out, the sky will turn gray (neutral) and the other image areas will look yellow. Previous attempts to solve this problem have included removing pixels that were too similar to adjacent pixels, so that a large colored area would be reduced to a smaller, representative patch. Unfortunately, this method is inaccurate and ineffective. With fewer samples, the estimate becomes less stable and less reliable. Also, in many cases, a color can fill a large part of a scene, but the color is not continuous, and therefore would not be affected. Also, there are often pixels that are colored by random sensor noise. These pixels can be awarded two much weight during the illuminant determination and bias the estimate after the other, more common colors have been reduced.

SUMMARY

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

Embodiments of the claimed subject matter are directed to methods for automatically balancing light in an image-capture device. In one embodiment, given an estimated illuminant color (e.g., derived from the Gray World method), a more optimal illuminant color can be found by projecting this point to a plot of common illuminants. For example, if the initial color estimate for the color of the light source is cyan, the closest point of the plot of common illuminants is derived, most likely somewhere at the blue end of the spectrum. The light will be estimated as twilight blue, for instance. In this case, the scene will be modeled as a green surface illuminated with bluish light, instead of as a gray surface illuminated with cyan light (as would result under the Gray World method).

Once the closest point of the plot of common illuminants is derived, the actual image (e.g., pixel) data of the scene is adjusted by the value of the closest point on the plot of common illuminants so that the light is "normalized" for the scene. In some embodiments, adjusting the actual image data consists of multiplying the color values obtained from the image data and multiplying those color values by the reciprocal of the value of the closest point on the plot of common illuminants for each color channel (e.g., Red, Green and Blue). The resultant image will have been balanced subject to better performing environmental-estimation techniques, thus advantageously providing an image having superior quality over conventional techniques of light balancing.

According to another aspect, a system configured to perform automatic light balancing is provided. In one embodiment, the process for automatically balancing light of a captured scene is performed in, for example, the processing unit of an exemplary image-capture device. In further embodiments, the process is supplemented with greater specificity with respect to selecting particular plots of common illuminants depending on the intensity of the light in an image or scene. In such embodiments, the system may further include one or more sensors capable of determining the intensity of the light in the image or scene.

In still further embodiments, a method for performing automatic light balancing on captured images for image-specific light intensities is provided. In one embodiment, the method comprises: recording a scene in an image capture device; determining the light intensity of the captured image;

selecting a plot of common illuminants corresponding to the determined light intensity; obtaining pixel data of the recorded image; plotting the pixel data on the selected plot of common illuminants; aggregating the pixel data into a figure such as a centroid; projecting the centroid or figure on to the selected plot of illuminants; deriving the corresponding balanced color values from the point of incidence of the centroid's projection; and adjusting the image data by the derived balanced color values. In some embodiments, the method is entirely performed within and by the image capture device, thus enabling the production of superior quality color-adjusted images from recorded scenes automatically, thus reducing the incidence of poorly-adjusted images and/or reducing the amount of user interaction and deliberation required, thereby improving user experience.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION

Figure 1:
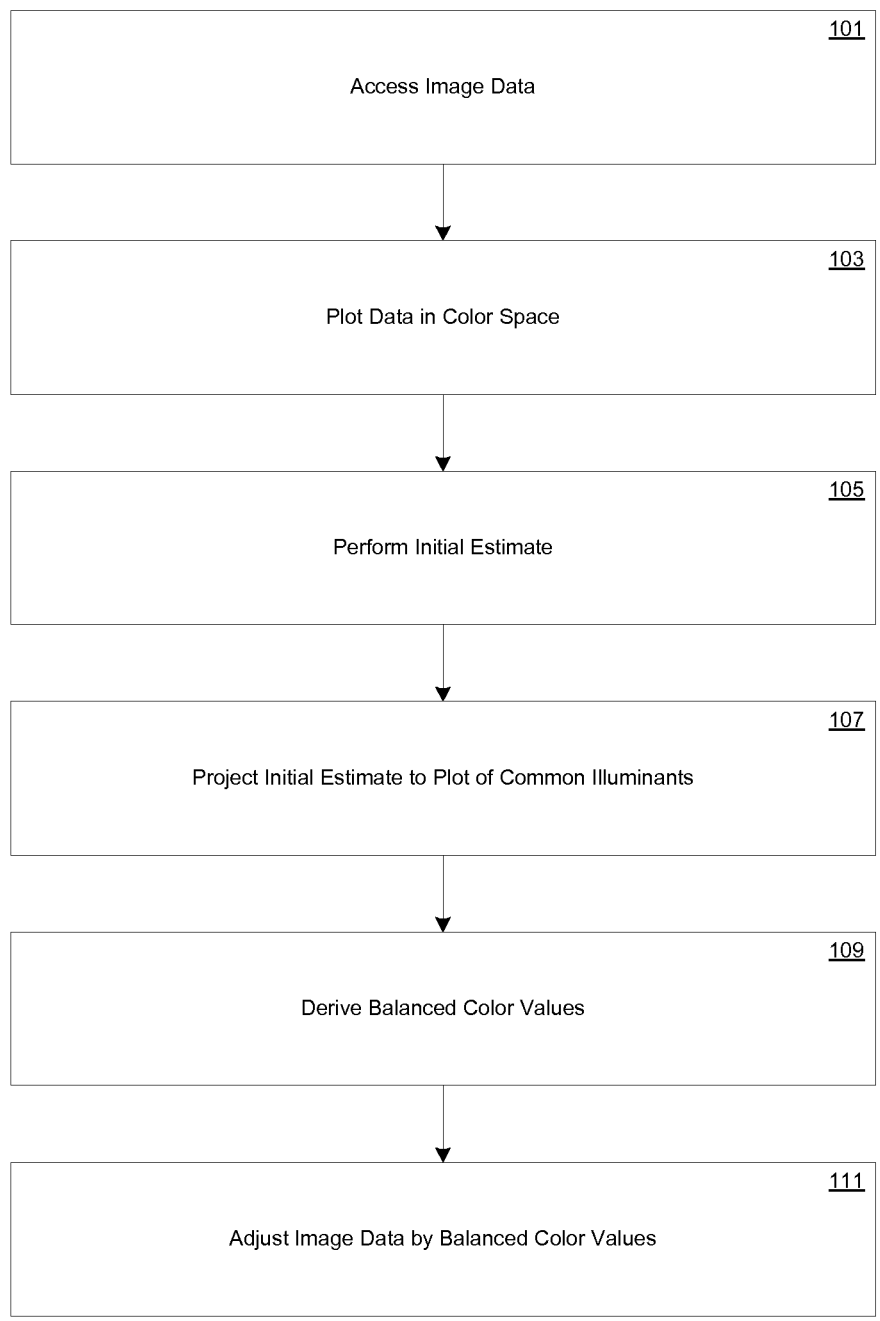
FIG. 1 depicts a flowchart of an exemplary process for automatically balancing white color in an image recorded by an image capture device, in accordance with various embodiments of the present invention.

Reference will now be made in detail to several embodiments. While the subject matter will be described in conjunction with the alternative embodiments, it will be understood that they are not intended to limit the claimed subject matter to these embodiments. On the contrary, the claimed subject matter is intended to cover alternative, modifications, and equivalents, which may be included within the spirit and scope of the claimed subject matter as defined by the appended claims.

Furthermore, in the following detailed description, numerous specific details are set forth in order to provide a thorough understanding of the claimed subject matter. However, it will be recognized by one skilled in the art that embodiments may be practiced without these specific details or with equivalents thereof. In other instances, well-known processes, procedures, components, and circuits have not been described in detail as not to unnecessarily obscure aspects and features of the subject matter.

Portions of the detailed description that follow are presented and discussed in terms of a process. Although steps and sequencing thereof are disclosed in figures herein describing the operations of this process, such steps and sequencing are exemplary. Embodiments are well suited to performing various other steps or variations of the steps recited in the flowchart of the figure herein, and in a sequence other than that depicted and described herein.

Some portions of the detailed description are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer-executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout, discussions utilizing terms such as "accessing," "writing," "including," "storing," "transmitting," "traversing," "associating," "identifying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Automatic Light Balancing

Embodiments of the claimed subject matter are directed to methods for balancing white color in an image recorded from an image-capture device. FIG. 1 depicts a flowchart 100 of an exemplary process for automatically balancing white color in an image recorded by an image capture device, in accordance with various embodiments of the present invention. In one embodiment, the process is performed in an image-capture device. In alternate embodiments, the process may be performed by, for example, an image production and/or replication device. Steps 101-111 describe exemplary steps of the flowchart 100 in accordance with the various embodiments herein described.

As depicted in flowchart 100, image data corresponding to a captured image or recorded scene is received at step 101. Image data may comprise, for example, data corresponding to the pixels comprising the image or scene. This pixel data may further include values such as digitized color values for a plurality of color channels (e.g., red, green, and blue). In alternate embodiments, pixel data may comprise luminance and chrominance values and a color vector. In some embodiments, image data is received in a central processing unit or other microprocessor of an image-capture device from a communicatively coupled optical sensor of the image-capture device, via a data communication bus, for instance (see FIG. 9). In further embodiments, the image data of an image is received and processed (e.g., steps 101-111 of flowchart 100 are performed) proximately after the image is captured within the same image-capture device. In still further embodiments, the pre-captured image data may be transferred from an external source (e.g., an image-capture device) to a computing device with image processing capability where the process of flowchart 100 is then performed. According to some embodiments, the image data may be stored in a computer readable memory device.

At step 103, the image data received step 101 is plotted in one or more color spaces. In one embodiment, each of the pixels comprising the image data of a scene comprises values corresponding to a plurality of color channels (e.g., an RGB color space). According to these embodiments, the color values of the pixels may be plotted in two or three dimensional spaces for two or more color channels. In alternate embodiments, the image data may comprise values in a luminance/chrominance color space (YUV color space) with a two dimensional color vector. According to these embodiments, the vector may be plotted in a two dimensional space for the given luminance and chrominance values.

At step 105, an initial estimate of the color values corresponding to the pixels comprising the image data is formed by averaging the color values to determine a first estimated illuminant color (e.g., a single point in a color space) comprising a value for each color channel. Once the initial color estimate is derived at step 105 a more optimal illuminant color can be found by projecting the estimated color values to a plot of likely illuminants at step 107, according to pre-stored data. Alternatively, each individual pixel may be initially projected to a plot of likely illuminants, and then the central position of the distribution along the plot may be determined as the first estimated illuminant color. For example, if the color of the light source is estimated to be cyan, the closest point on the plot of common illuminants is derived. In a color space where the color blue comprises an axis, the point on the plot of common illuminants would most likely be somewhere at the blue end of the spectrum. The resultant "balanced" light will be estimated as twilight blue, for instance. In this case, the scene may be modeled as a green surface illuminated with bluish light, instead of as a gray surface illuminated with cyan light (as would originally be the result under the Gray World method).

The plot of common illuminants may be implemented in a variety of manners such as (but not limited to) a curved line; a straight line; or a multi-dimensional figure (e.g., a bar). Thus, projecting an average value to a plot may comprise (for straight line plots) deriving the shortest perpendicular from the point in color space corresponding to the estimated average color to the plot of common illuminants. Likewise, projecting an average value to a plot may also comprise deriving the shortest perpendicular from the point in color space corresponding to the estimate average color to a tangent of the plot of common illuminants for curved line plots. In embodiments where the plot of common illuminants comprises a multi-dimensional figure such as a bar, an average color estimate disposed outside the bounded area of the bar in the color space may be projected to the closest point on the bar (e.g., shortest perpendicular to a point on the outline of the bar). In such embodiments, average color estimates disposed within the bounded area of the bar may not be projected at all.

In varying embodiments, the projection can be full or partial. If the light source is far from the curve (e.g., above a pre-specified threshold), it can be moved closer to the curve by, for example, averaging its position with the projected position on the curve. If the color is at the limits of the plot, it can be shifted to a more centered position on the plot by modifying the color values. This can be accomplished by, for example, performing a clamping zone function which may be used as an alternative method to avoid excessive outliers or unlikely color values. For example, If the illuminant is projected to have color values that translate to being bluer than daylight (very unlikely), one or more of the color values of the illuminant can be shifted back towards the values for normal daylight by replacing the illuminant color projected in step 107 with the values for normal daylight. This mitigates the problem of Gray World being biased by large areas of blue sky. Likewise, a light which is projected to be more "orange" (in terms of color values) than tungsten light, may have the underlying color values modified to approximate the color values more consistent with typical tungsten-illuminant color values. Performing this adjustment prevents large areas of orange becoming overly de-saturated through the performance of the Gray World method.

In some instances, particularly excessive outliers and/or overrepresented colors may disproportionately skew the average color values for a scene. In some embodiments, it may be desirable to remove such outliers from any calculation of average. Removing such outliers may be performed by, for example, forming a color histogram, and removing (filtering) histogram bins with too many representatives (e.g., above a threshold). A lower threshold can also be used to remove very uncommon colors, which may be due to sensor noise. The lower threshold can be dynamically set or pre-determined by a scale factor that depends on the noise level. Thus, outlying pixels which may exceed the "threshold" are not included in the calculation for the first estimated illuminant color.

Alternatively, scenes or images may comprise large areas of single colors or portions of highly saturated colors to the extent that mitigating the saturation in a calculation of the average color values may be beneficial to avoid over-correction during a subsequent color adjustment (see below with reference to step 111). Mitigation of saturated colors may be performed by aggregating the plot of average color values into a centroid (or other bounded figure) with pre-specified boundaries prior to averaging the color values of the comprising pixels. Thus, certain color values may be specifically and presciently prohibited from consideration of a scene's average color value.

According to further embodiments, instead of using an average estimated illuminant point, the estimated point may be projected to a line of likely illuminants. When each color is projected to a curve, it can be described by a single dimension. By reducing the dimensionality, a one dimensional histogram may be used (rather than multi-dimensional histograms), thus reducing the complexity of remaining calculations required to perform the method.

According to still further embodiments, in addition to a plot of probable illuminants, a multidimensional probability field can be used to estimate the initial value of the illuminant. Thus, instead of a simple estimate of illuminant color, a multidimensional probability field can be used as a factor in the initial illuminant estimation. For example, the Gray World technique may be performed to derive an initial estimate of the color of the light (e.g., cyan), but if the scene had very few colors, the probability that the derived color is the optimal (e.g., most accurate) color is typically low. In such cases, the illuminant may be compared to a probability field, with a maximum probability at the cyan point and a derived buffer distance away from this point. Likewise, for every illuminant color, there may be a likelihood of that illuminant happening in any scene. With probability summation between the probability fields of the illuminant likelihoods and the illuminant estimate, the maximally probable light source may be determined with greater degrees of accuracy.

At step 109, color values are derived corresponding to the intersection of the plot of common illuminants and the projection of the estimated color values performed at step 107. The color values may, for example, comprise a plurality of coordinates (in multi-dimensional space) corresponding to a plurality of color channels. For example, for a typical RGB color space, color values corresponding to the red, green, and blue value, respectively, of the point at the intersection may be derived. In a typical YUV color space, the coordinates of the point in the color space may be derived. These color values thus represent the balanced white color used to adjust the image data of the pixels in step 111 described below.

At step 111, the image data received at step 101 is adjusted by the balanced white color derived at step 109. In embodiments comprising RGB color spaces, adjusting the image data may comprise, for example, adjusting the color value of each pixel of the scene or image by the reciprocal of the color value for the corresponding color channel. Thus, for any given pixel in the image or scene, the value of the red color channel is adjusted by being multiplied by the reciprocal of the value of the red color channel of the balanced white color derived in step 109. For embodiments featuring a YUV color space, the color values for each pixel in the image or scene may be multiplied by the reciprocals of the associated derived balanced coordinates.

By adjusting the color values of the pixels of any given image of a scene by the illuminant color value of a naturally occurring illuminant which most approximates the average color values of the image, a more accurate balancing of the color values with respect to the illuminant may be performed, thus resulting in images exhibiting color values that correspond with greater accuracy to the color values of the actual scene that was captured.

Automatic White Balancing for Specific Light Intensities

Figure 2:
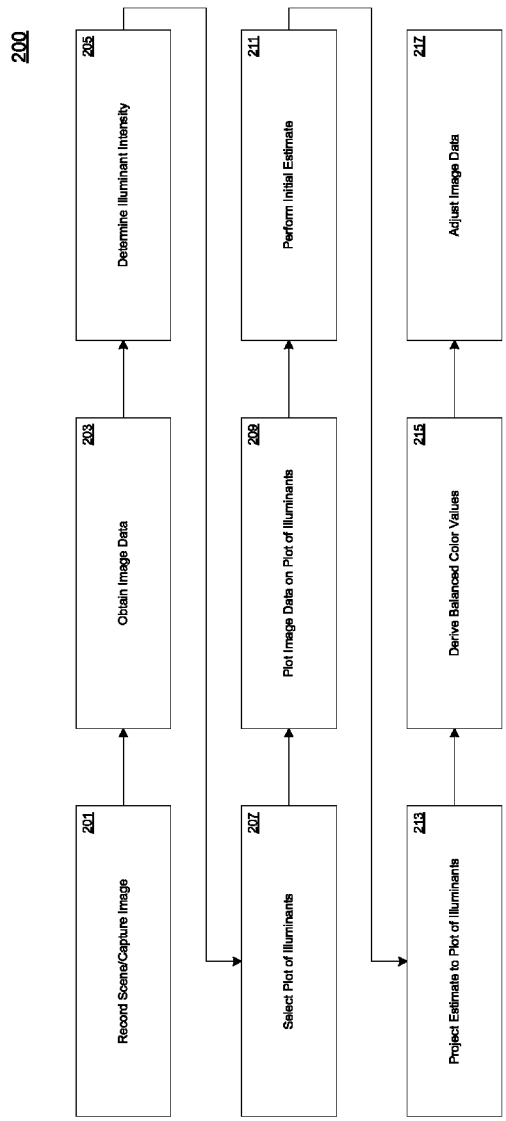
FIG. 2 depicts a flowchart of a process for automatically balancing light in an image capture device for specific light intensities, in accordance with various embodiments of the present invention.

FIG. 2 depicts a flowchart 200 of a process for automatically balancing light in an image capture device for specific light intensities, in accordance with various embodiments of the present invention. In one embodiment, the process is performed in an image-capture device. Steps 201-217 describe exemplary steps of the flowchart 200 in accordance with the various embodiments herein described.

At step 201, an image or scene is captured and/or recorded on an image-capture device or video recording device. According to some embodiments, the image or scene may be captured by one or more optical sensors. According to further embodiments, the image or scene may be captured by the one or more optical sensors in conjunction with one or more lens. Such embodiments may be implemented as a digital camera, such as the system 900 described below with reference to FIG. 9.

At step 203, the captured scene or image may be processed and analyzed to obtain image data. In some embodiments, the digital image data may be rendered by a central processing unit or processor in the image capture device used to capture or record the scene or image. Image data may comprise, for example, color and/or luminance values for each pixel comprising the scene or image. In one embodiment, image data may also comprise the detected brightness or intensity of the illuminants in the scene or image.

At step 205, the intensit(y/ies) (e.g., brightness) of the illuminant(s) present in the image or scene captured in step 201 is/are determined. According to some embodiments, the image-capture or video recording device may determine the brightness of illuminants present in an image via additional optical sensors with specialized light-intensity sensing capability. In alternate embodiments, determining the intensity of any illuminants may not require additional optical sensors. In some embodiments, the intensity of the illuminants may be determined concurrently with the capturing of the image or scene. Alternately, the intensity of the illuminants may be determined once the image has been captured via an analysis of the captured image data.

According to still further embodiments, rather than using a single plot as described above with reference to step 103 of FIG. 1, a higher dimensional surface may be used as a plot of common illuminants to project the illuminant color value at step 207. For example, a plot that varies as a function of overall scene brightness or light intensity may be used in some embodiments. Brightly lit scenes are usually lit with natural light, and dimly lit scenes are usually lit with artificial light. For a given scene brightness, the plot of illuminants that are most common at that brightness level is used. Thus the plot of common illuminants may further be one of a plurality (e.g., a library) of plots, where each plot may be specific for a given attribute of a scene or image. In some embodiments, image data received in step 101 includes a detected illuminant intensity value. The plot of common illuminants is thus selected to correspond to the detected illuminant intensity. In some embodiments, one or more plots of common illuminants may be pre-programmed. In further embodiments, one or more plots of common illuminants may be empirically derived by the user on an ad hoc basis.

In one embodiment, a family of plots that varies with brightness can be implemented as a two-dimensional surface. Likewise, higher dimensional surfaces can be used as well. For example, given the time of day, the brightness of the scene, and the current temperature, a set of lights may have different probabilities. For example, during conditions which are dark and low temperature, it is much more likely that an illuminant could be very orange (such as low pressure sodium vapor street light). Conversely, if it is hot and bright during the day, direct sunlight is much more likely. Given any data parameters, a different plot or probability field can be used. Useful parameters could include but are not limited to: time, latitude, longitude, temperature, compass heading, and whether an imaging device's flash setting is toggled on or off.

Once a plot of illuminants has been selected at step 207, the image data obtained at step 203 is plotted in a color space with the plot of illuminants at step 209. Step 209 may be performed as described above with reference to step 103. Steps 211, 213, 215 and 217 may be performed as described above with reference to steps 105, 107, 109 and 111 of FIG. 1, respectively. Thus, by adjusting the color values of the pixels of any given image of a scene by the illuminant color value of a naturally occurring illuminant which most approximates the average color values of the image and specific to the determined brightness of the scene captured, an even more accurate balancing of the color values with respect to the illuminant may be performed, thus resulting in images exhibiting color values that correspond with greater accuracy to the color and luminance values of the actual scene that was captured.

Exemplary Plot of Illuminants

Figure 3:
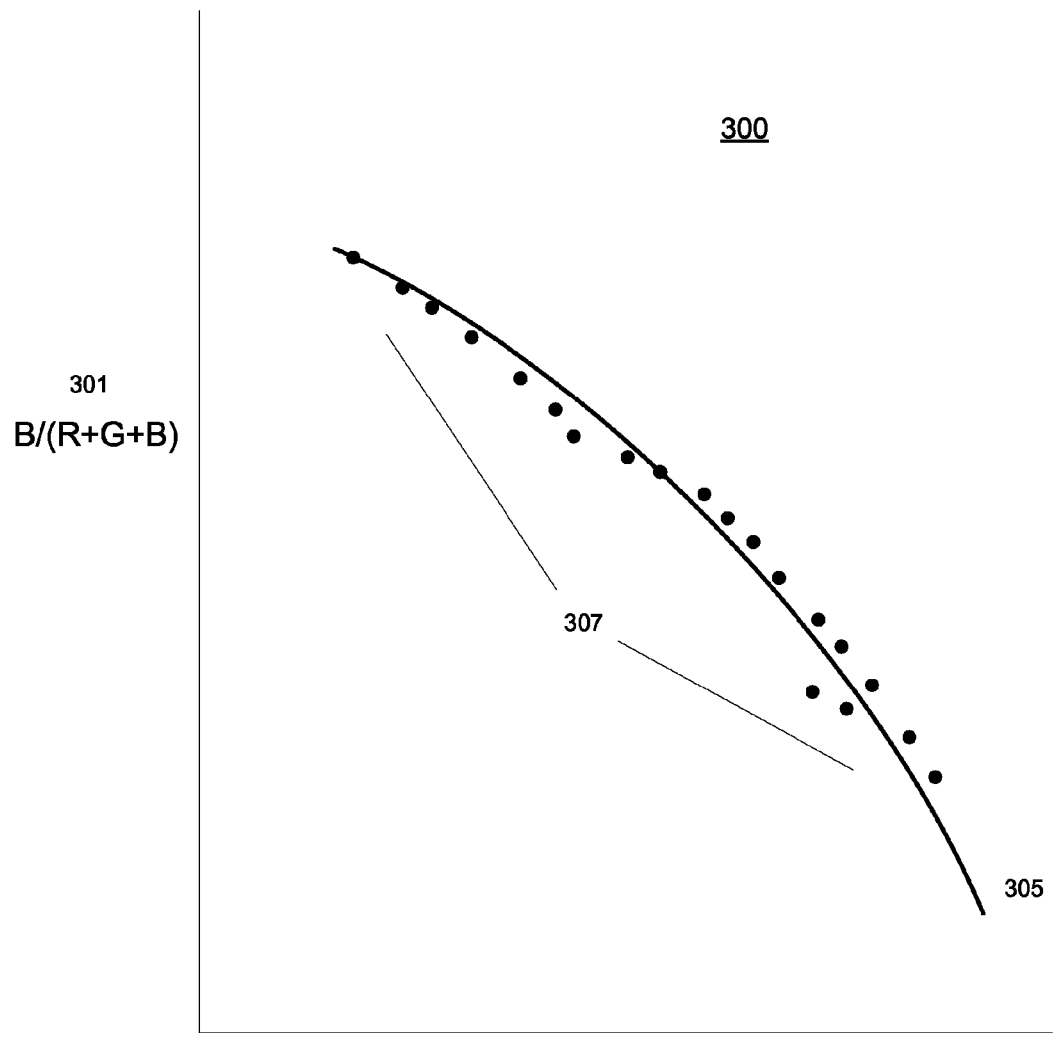
FIG. 3 depicts a curved-line plot of common illuminants in an exemplary color space, in accordance with various embodiments of the present invention.

FIG. 3 depicts a curved-line plot of common illuminants in an exemplary color space 300, in accordance with various embodiments of the present invention. As depicted, color space 300 displays two of three color channels (Red and Blue) of an RGB color space. Color space 300 may also comprise a typical two dimensional color space of a YUV color space.

As presented in FIG. 3, color space comprises a vertical axis 301 and a horizontal axis 303. As depicted, the vertical axis 301 corresponds to the blue aspect of an RGB color space. Likewise, the horizontal axis 303 corresponds to the red aspect of an RGB color space. Color space 300 includes positions 307 in the color space 300 corresponding to a plurality of neutral colored surfaces under specific lighting sources consisting of pre-stored illuminant information. According to some embodiments, this data may also be empirically provided by a user on an ad hoc basis. According to various embodiments, the positions in the color space 300 may be arranged as a plot. As presented in FIG. 3, the plot is implemented as a curve 305 of best fit.

According to various embodiments, in a process for automatic white balancing, once an initial illuminant estimate is determined, the initial illuminant estimate is projected to a plot of illuminants (e.g., plot 305). The intersection of the plot and the projection may subsequently be used to adjust image data to balance the effect of the illuminant in the scene in processes such as those described with reference to flowchart 100 and 200 described above.

Figure 4:
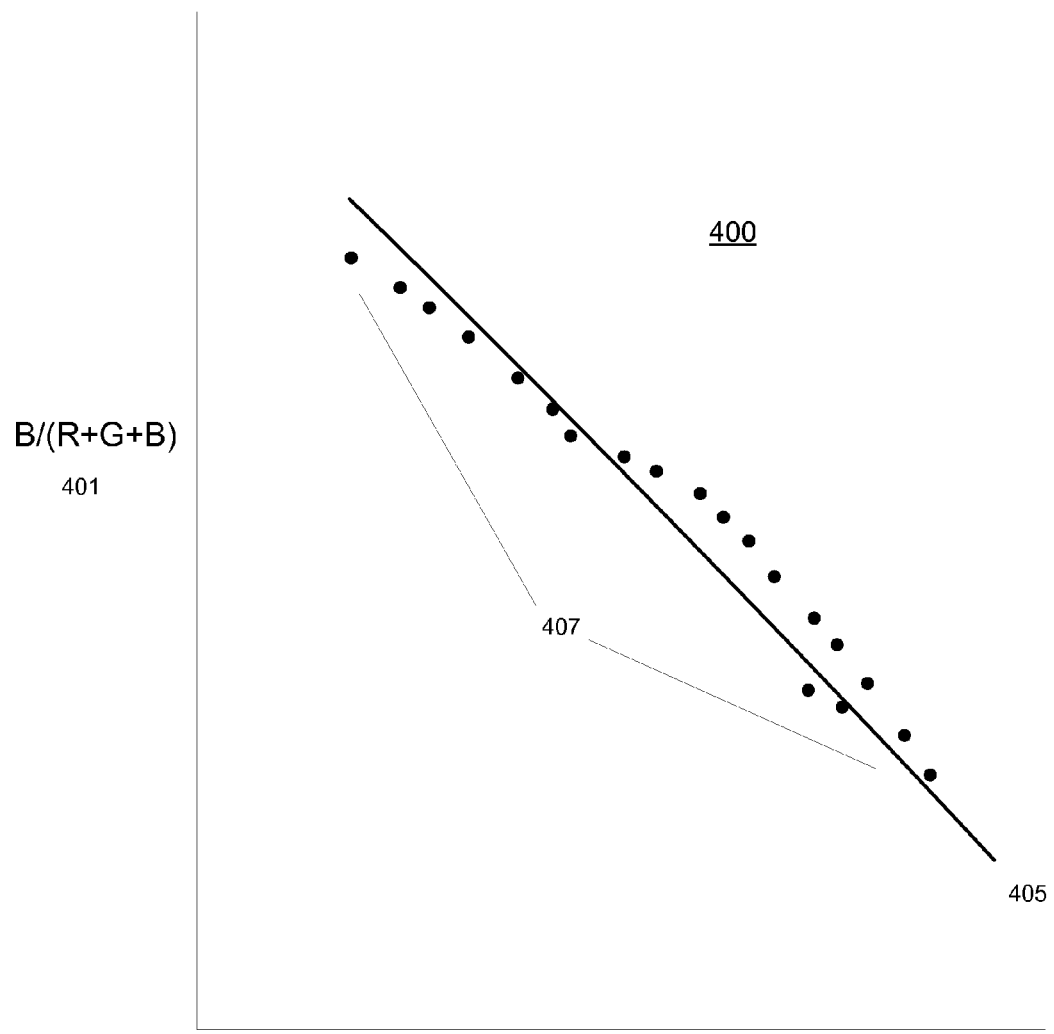
FIG. 4 depicts a straight-line plot of common illuminants in an exemplary color space, in accordance with various embodiments of the present invention.

FIG. 4 depicts a straight-line plot of common illuminants in an exemplary color space 400, in accordance with various embodiments of the present invention. Certain elements of FIG. 4, unless otherwise noted, correspond with, and are enumerated similarly to, like elements of FIG. 3 (e.g., 301 corresponds to 401, 303 corresponds to 403, etc.). As presented, color space 400 displays two of three color channels (Red and Blue) of an RGB color space. Color space 400 may also comprise a typical two dimensional color space of a YUV color space.

Vertical axis 401, a horizontal axis 403 and pre-stored color values 407 correspond to similarly enumerated counterparts 301, 303 and 307 of FIG. 3. Likewise, the pre-stored color values 407 in the color space 400 may be arranged as a plot. As presented in FIG. 4, the plot is implemented as a straight line 405 of best fit.

According to various embodiments, in a process for automatic illuminant balancing, once an initial illuminant estimate is determined, the initial illuminant estimate is projected to a plot of illuminants (e.g., plot 405). The intersection of the plot and the projection may subsequently be used to adjust image data to balance the effect of the illuminant in the scene in processes such as those described with reference to flowchart 100 and 200 described above.

Exemplary Initial Estimate Projections

Figure 5:
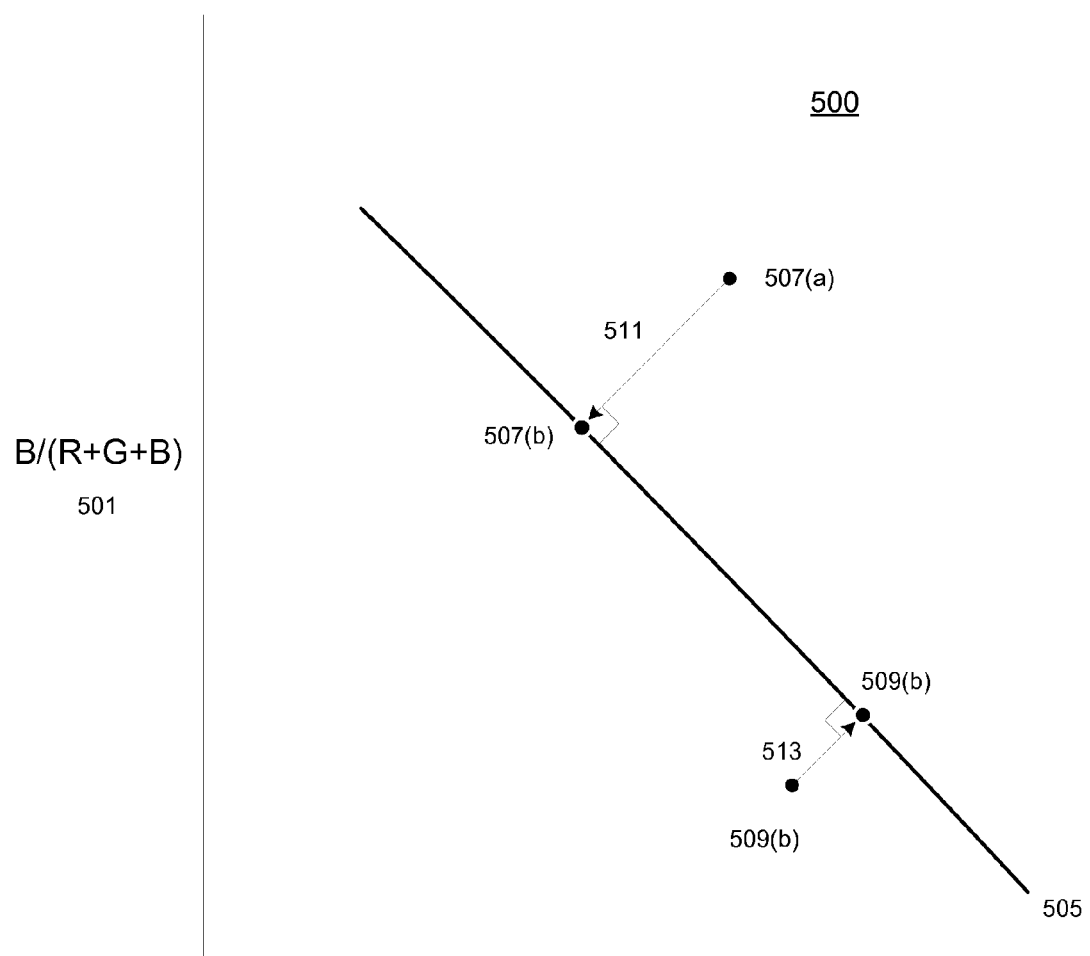
FIG. 5 depicts projecting a plurality of pixels of a scene to a straight-line plot of common illuminants in an exemplary color space, in accordance with various embodiments of the present invention.

FIG. 5 depicts projecting a plurality of pixels of a scene to a straight-line plot of common illuminants in an exemplary color space 500, in accordance with various embodiments of the present invention. Color space 500, as presented in FIG. 5, includes similar features with color spaces 300 and 400 of FIGS. 3 and 4 (respectively) described above. Specifically, vertical axis 501, horizontal axis 503 and plot 505 correspond to the vertical axis (401), horizontal axis (403) and straight line plot (405) as described above with reference to FIG. 4.

In a typical embodiment, image data corresponding to a captured scene may comprise a plurality of pixels, each having a corresponding color value in a color space (e.g., color space 500). As presented, color space 500 includes a plurality of points (e.g., point 507($a$), 509($a$)), each point comprising a unique color in a color space 500. In one embodiment, the plurality of points (point 507($a$), 509($a$)) may comprise the average color for all (or significantly all) pixels comprising an image of a scene. For example, points 507($a$) and 509($a$) may comprise, for example, the initial illuminant estimate for two separate images, as derived in step 105 of flowchart 100 and step 211 of flowchart 200, described above. Once an initial illuminant estimate for an image is derived, a better (e.g., more accurate) color may be used to adjust an image for white balancing by projecting the initial estimate to the plot of illuminants 505.

As depicted, initial estimate 507($a$) may be projected to plot 505 to a "balanced" point (e.g., point 507($b$)). Likewise, initial estimate 509($a$) may be projected to plot 505 at 509($b$). Projection may depend on the type of plot used. In embodiments featuring a straight-line plot, projection may comprise taking the intersection of the shortest perpendicular (e.g., perpendicular 511, 513) from the respective corresponding initial estimate and the plot.

Figure 6:
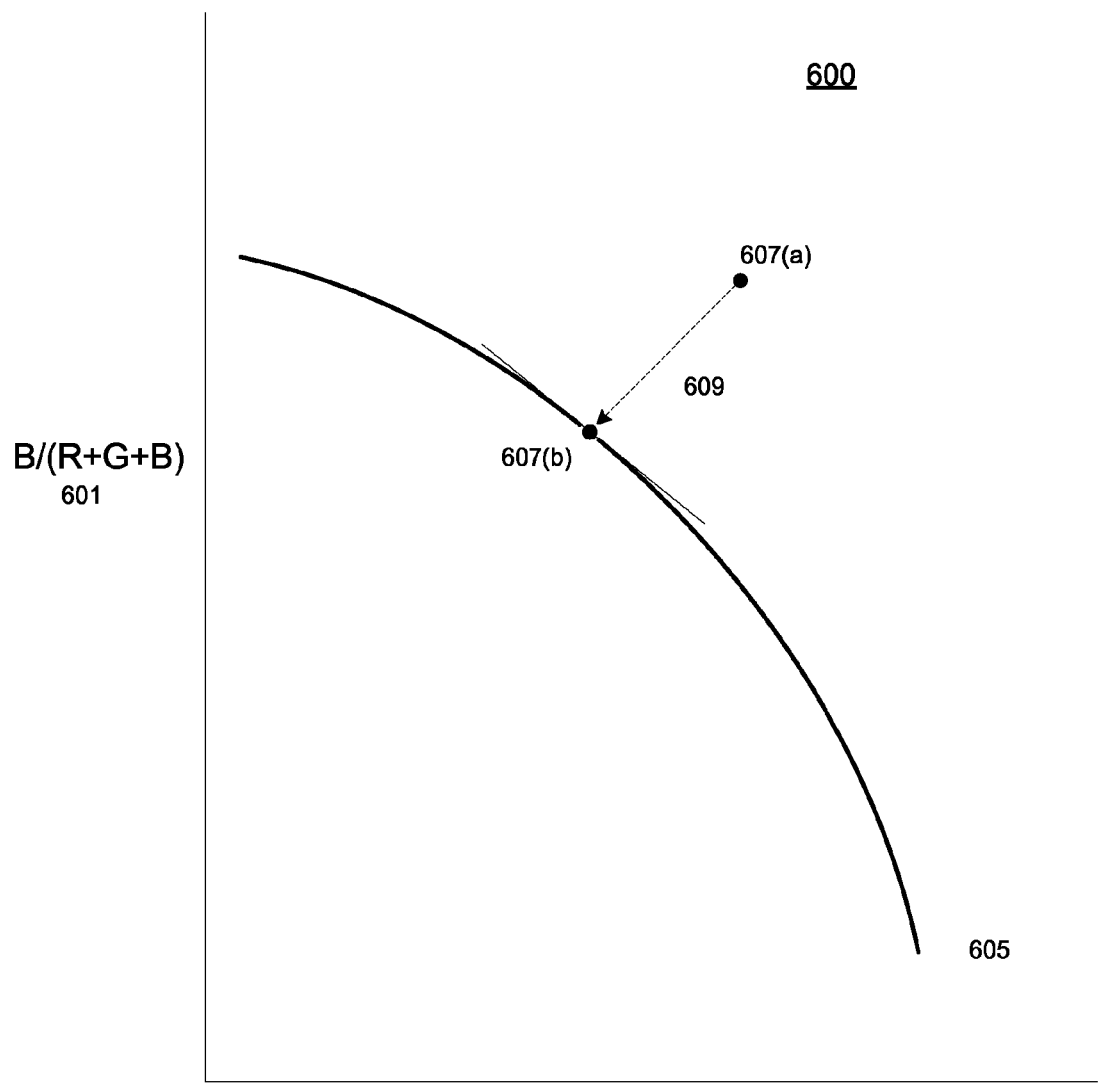
FIG. 6 depicts projecting a plurality of pixels of a scene to a curved-line plot of common illuminants in an exemplary color space, in accordance with various embodiments of the present invention.

FIG. 6 depicts projecting a plurality of pixels of a scene to a curved-line plot of common illuminants in an exemplary color space 600, in accordance with various embodiments of the present invention. Color space 600, as presented in FIG. 6, includes similar features with various color spaces (e.g., color space 500 of FIG. 5) described above. Accordingly, unless otherwise noted, features of similarly identified features are herein described to correspond to like numbered features described above.

As presented, color space 600 includes a point (e.g., point 607($a$)) comprising a unique color in a color space 600 which may also comprise the average color for all (or significantly all) pixels comprising an image of a scene. Thus point 607($a$) may comprise the initial illuminant estimate for two separate images, as derived in step 105 of flowchart 100 and step 211 of flowchart 200, described above. Once an initial illuminant estimate for an image is derived, a better (e.g., more accurate) color may be used to adjust an image for white balancing by projecting the initial estimate to the plot of illuminants 605.

As depicted, initial estimate 607($a$) may be projected to plot 605 to a "balanced" point (e.g., point 607($b$)). In embodiments featuring a curved-line plot, projection may comprise taking the intersection of the perpendicular (611) from the initial estimate and the tangent of the closest point on the plot.

Figure 7:
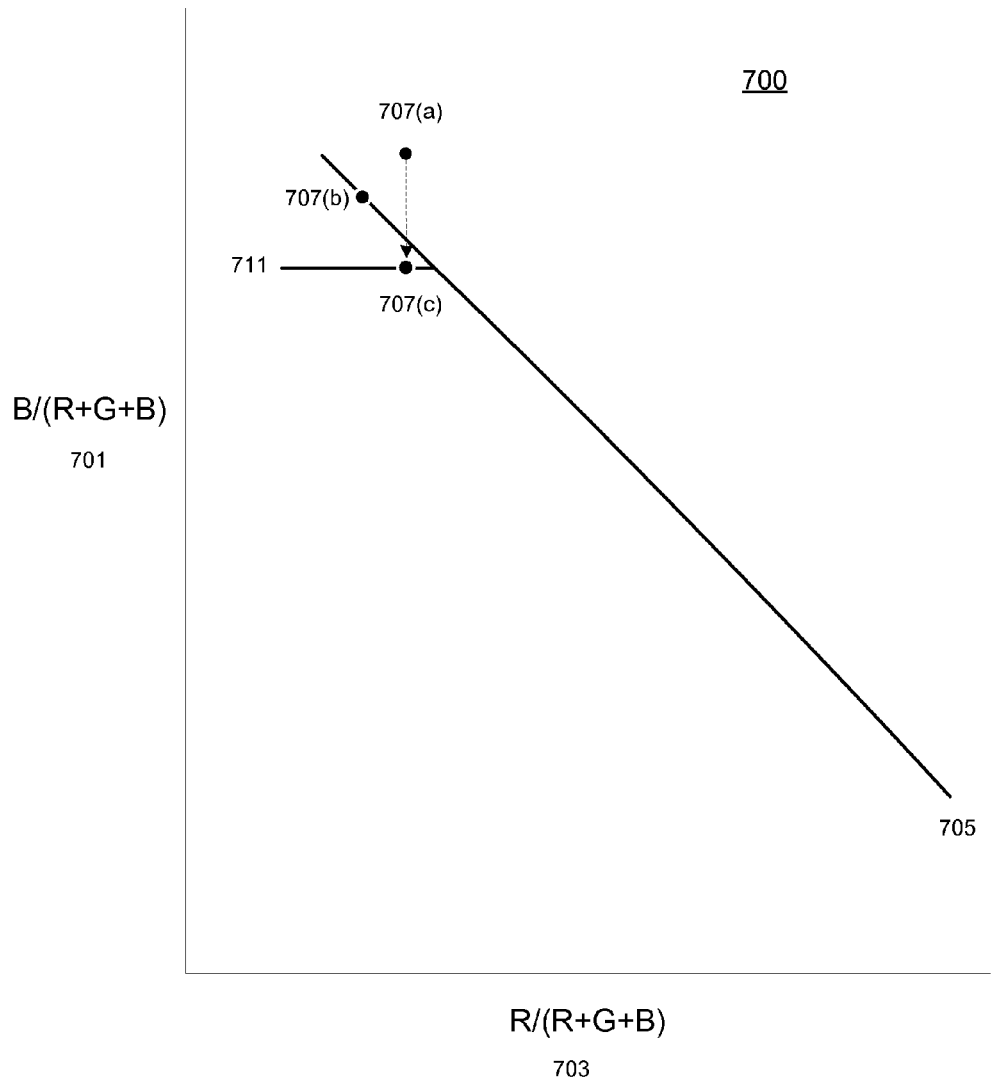
FIG. 7 depicts projecting a plurality of pixels of a scene to a straight-line plot of common illuminants exhibiting a clamping function in an exemplary color space, in accordance with various embodiments of the present invention.

According to some embodiments, overly saturated scenes may produce images which may, even after adjustment, produce undesirable results. In such instances, clamping extreme points to avoid excessive outliers or unlikely color values may be desirable to achieve superior results. FIG. 7 depicts projecting a plurality of pixels of a scene to a straight-line plot of common illuminants exhibiting a clamping function in an exemplary color space 700, in accordance with various embodiments of the present invention. Color space 700, as presented in FIG. 7, includes similar features with various color spaces (e.g., color space 500 of FIG. 5) described above. Accordingly, unless otherwise noted, features of similarly identified features are herein described to correspond to like numbered features described above.

As depicted in FIG. 7, color space 700 includes vertical limit 711. Vertical limit 711 thus represents the color value of a color channel (in this case, blue) above which may be the result of over-saturation. Thus, for color values having a blue value above the vertical limit 711, rather than having the initial estimated illuminant (707($a$)) be projected to the shortest perpendicular (707($b$)) to the plot of illuminants 705, instead, the initial estimated illuminant 707($a$) is projected to the intersection with the shortest perpendicular (707($c$)) of vertical limit 711. In some embodiments, once the projection to the vertical limit 711 is performed, the resultant color values may be used to adjust an image for white balancing.

Figure 8:
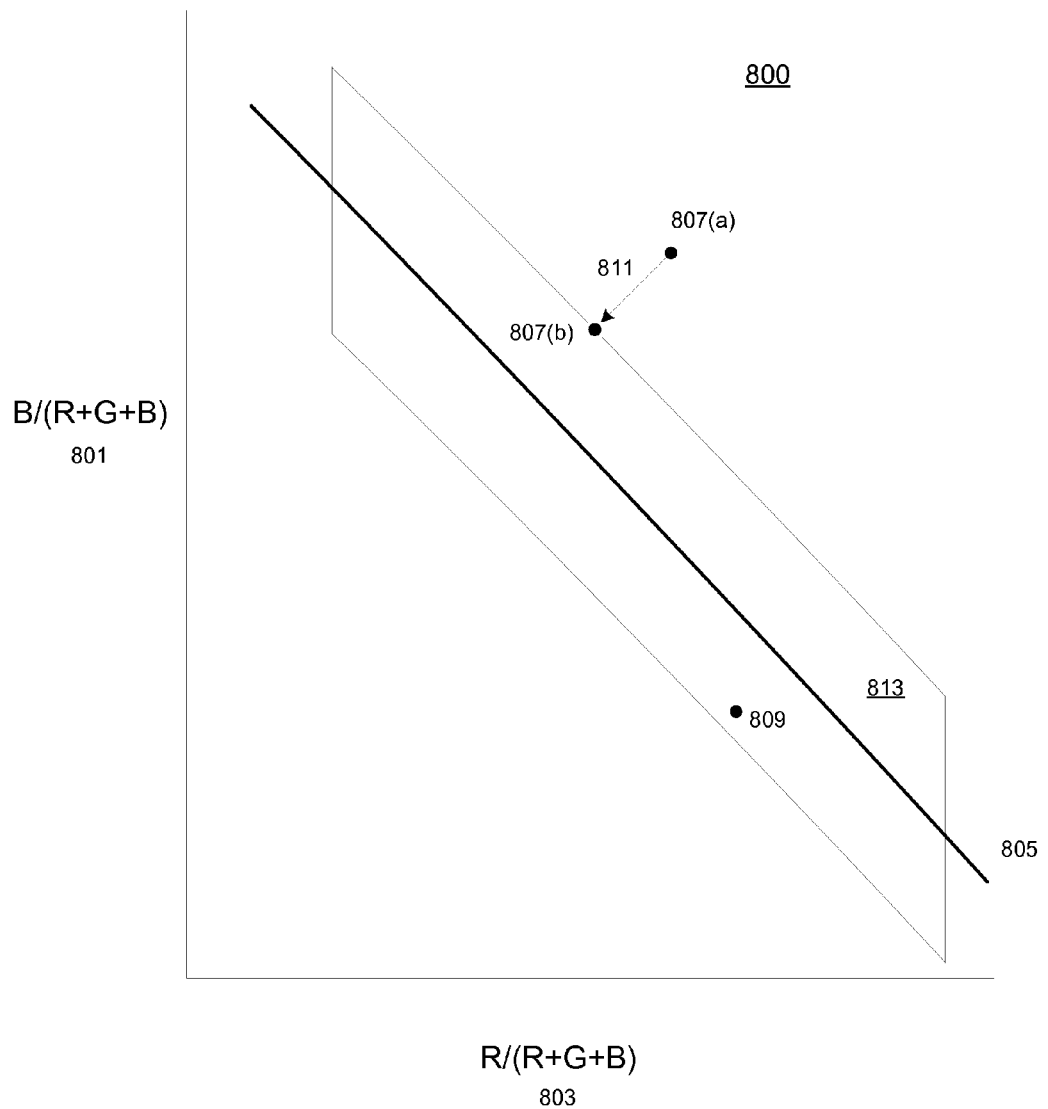
FIG. 8 depicts projecting a plurality of pixels of a scene to a multi-dimensional plot of common illuminants in an exemplary color space, in accordance with various embodiments of the present invention.

According to various embodiments, the plot of common illuminants may be implemented as a multi-dimensional figure such as a bar. FIG. 8 depicts projecting a plurality of pixels of a scene to a bar plot of common illuminants in a color space 800, in accordance with various embodiments of the present invention. Color space 800, as presented in FIG. 8, includes similar features with various color spaces (e.g., color space 500 of FIG. 5) described above. Accordingly, unless otherwise noted, features of similarly identified features are herein described to correspond to like numbered features described above.

As depicted in FIG. 8, color space 700 includes bounding bar 813. In such embodiments, an average color estimate (e.g., point 807(a)) disposed outside the bounded area of the bar in the color space may be projected to the closest point on the bar (e.g., 807(b)). Projection may be derived by finding the shortest perpendicular (811) to a point on the outline of the bar, rather than to the plot of common illuminants. According to some embodiments, average color estimates disposed within the bounded area of the bar (809) may not be projected at all.

Exemplary Operating Environment

Figure 9:
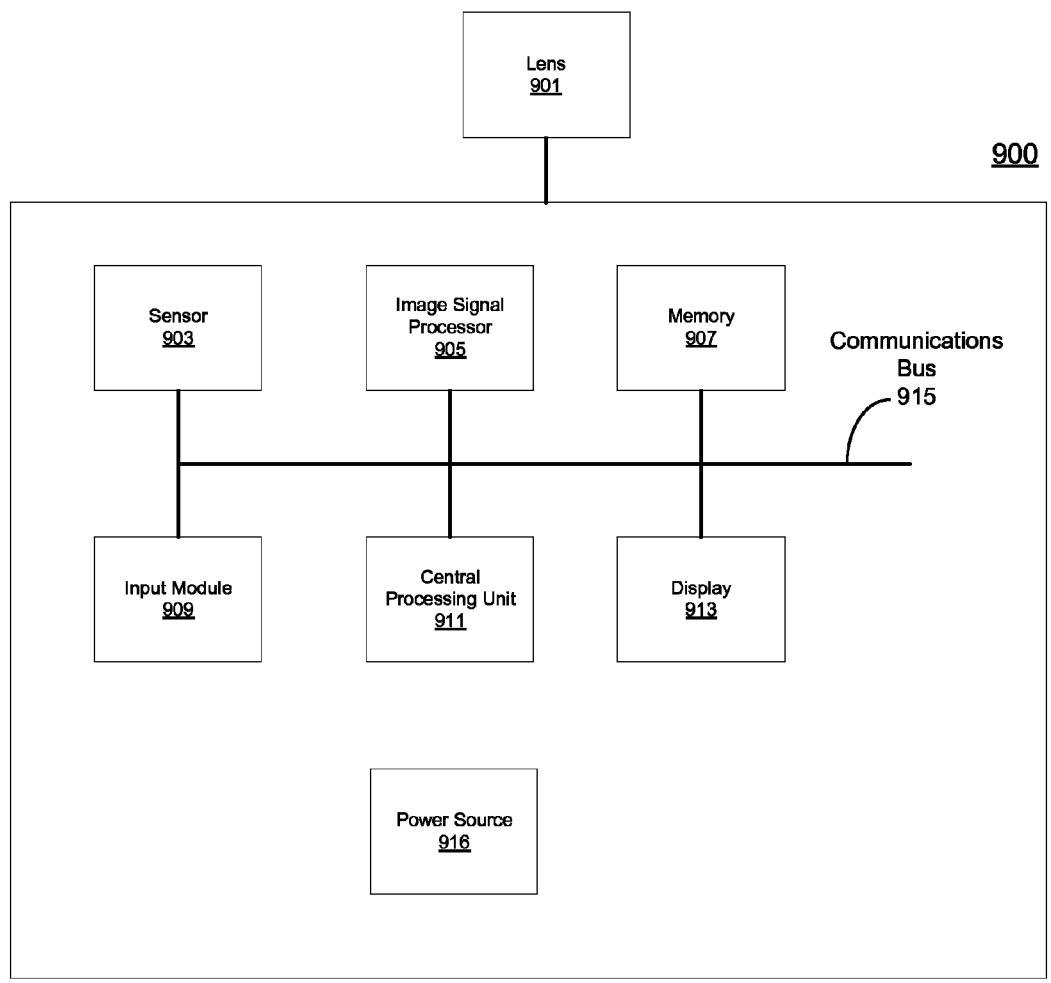
FIG. 9 depicts an exemplary operating environment in which various embodiments of the present invention may be performed.

FIG. 9 shows an exemplary operating environment in accordance with one embodiment of the present invention. Digital system 900 depicts the components of a basic system in accordance with embodiments of the present invention providing the execution platform for certain hardware-based and software-based functionality. Although specific components are disclosed in system 900 it should be appreciated that such components are examples. That is, embodiments of the present invention are well suited to having various other components or variations of the components recited in system 900. It is appreciated that the components in system 900 may operate with other components other than those presented, and that not all of the components of system 900 may be required to achieve the goals of system 900.

In a typical embodiment, System 900 includes sensor 903, image signal processor (ISP) 905, memory 907, input module 909, central processing unit (CPU) 911, display 913, communications bus 915, and power source 916. Power source 916 supplies power to system 900 and may, for example, be a DC or AC power source. CPU 911 and the ISP 905 can also be integrated into a single integrated circuit die and CPU 911 and ISP 905 may share various resources, such as instruction logic, buffers, functional units and so on, or separate resources may be provided for image processing and general-purpose operations. System 900 can be implemented as, for example, a digital camera, cell phone camera, portable device (e.g., audio device, entertainment device, handheld device), webcam, video device (e.g., camcorder) and the like.

Sensor 903 receives light via a lens 901 and converts the light received into a signal (e.g., digital or analog). According to some embodiments, lens 901 may be permanently attached to the system 900. Alternatively, lens 901 may be detachable and interchangeable with lens of other properties. These properties may include, for example, focal lengths, apertures and classifications. In typical embodiments, lens 901 may be constructed of glass, though alternate materials such as quartz or molded plastics may also be used. Sensor 903 may be any of a variety of optical sensors including, but not limited to, complementary metal-oxide-semiconductor (CMOS) or charge-coupled device (CCD) sensors. Sensor 903 is coupled to communications bus 915 and may provide image data received over communications bus 915. In further embodiments, sensor 903 includes light intensity sensing capability, and the image data received may include data corresponding to the determined intensity of the light in a scene or image.

Image signal processor (ISP) 905 is coupled to communications bus 915 and processes the data generated by sensor 903. More specifically, image signal processor 905 processes data from sensor 902 for storing in memory 907. For example, image signal processor 905 may compress and determine a file format for an image to be stored in within memory 907.

The input module 909 allows the entry of user-input into system 900 which may then, among other things, control the sampling of data by sensor 903 and subsequent processing by ISP 905. Input module 909 may include, but it not limited to, navigation pads, keyboards (e.g., QWERTY), buttons, touch screen controls (e.g., via display 913) and the like.

The central processing unit (CPU) 911 receives commands via input module 909 and may control a variety of operations including, but not limited to, sampling and configuration of sensor 903, processing by ISP 905, and management (e.g., the addition, transfer, and removal) of images and/or video from memory 907.

Although the subject matter has been described in language specific to structural features and/or processological acts, it is to be understood that the subject matter defined in the appended claims is not necessarily limited to the specific features or acts described above. Rather, the specific features and acts described above are disclosed as example forms of implementing the claims.

What is claimed is:

1. A method for automatic white balancing in an imaging device, the method comprising:
    accessing image data corresponding to a captured scene, said image data comprising a plurality of pixels, said plurality of pixels comprising a plurality of color values corresponding to a plurality of color channels;
    plotting said plurality of pixels in a color space comprising a plurality axes corresponding to said plurality of color channels;
    calculating an average color value for said plurality of pixels;
    projecting, in said color space, said average color value to a plot of common illuminants;
    deriving, on said plot of common illuminants, a set of balanced color values comprising a plurality of color values corresponding to a closest approximation on said plot of common illuminants to said average color value; and
    adjusting said plurality of color values of said plurality of pixels by said set of balanced color values to arrive at a plurality of adjusted pixels,
    wherein said plot of common illuminants comprises a plot of common illuminants specifically corresponding to an attribute of said captured scene.

2. The method according to claim 1, wherein said calculating said average color value comprises:
    determining a selection of said plurality of pixels to aggregate into a centroid;
    aggregating said selection into a centroid; and
    averaging, for each of said plurality of color channels, a plurality of color values comprised by said plurality of pixels comprising said selection.

3. The method according to claim 2, wherein said determining a selection comprises establishing, in said color space, a bounded area encompassing said plot of common illuminants, wherein pixels of said plurality of pixels which are disposed outside of said boundary are excluded from said aggregating of said centroid.

4. The method according to claim 1, wherein said plot of common illuminants comprises a line.

5. The method according to claim 1, wherein said plot of common illuminants comprises a curved line.

6. The method according to claim 1, wherein said plot of common illuminants comprises a multi-dimensional figure.

7. The method according to claim 1, wherein said deriving said set of color values comprises determining a single point on said plot of common illuminants most proximate to said average color value.

8. The method according to claim 1, wherein said adjusting comprises:
for each color channel of said plurality of color channels, adjusting a color value corresponding to a color channel of a pixel of said plurality of pixels by multiplying the color value corresponding to a color channel by a reciprocal of a color value of the set of color values corresponding to the same color channel.

9. The method according to claim 1, further comprising:
determining a first light intensity corresponding to said scene, said first light intensity comprised within a range of light intensities, wherein said plot of common illuminants is specific to said first light intensity.

10. The method according to claim 1, wherein said color space comprises a horizontal axis and a vertical axis, and wherein further a pixel of said plurality of pixels comprises a plurality of values corresponding to a horizontal coordinate and a vertical coordinate in said color space.

11. The method according to claim 10, further
instituting, on said plot of common illuminants, a first limit, said first limit comprising a first vertical coordinate corresponding to said vertical axis of said color space and a second limit, said second limit comprising a first horizontal coordinate corresponding to said horizontal axis of said color space;
determining whether a pixel of said plurality of pixels comprises a second vertical coordinate greater than said first vertical coordinate and whether a pixel of said plurality of pixels comprises a second horizontal coordinate greater than said first horizontal coordinate;
in response to said determining, clamping said second vertical coordinate of said pixel to said first vertical coordinate when said second vertical coordinate of said pixel is greater than said first vertical coordinate and clamping said second horizontal coordinate of said pixel to said first horizontal coordinate when said second horizontal coordinate of said pixel is greater than said first horizontal coordinate, wherein said instituting and said determining are performed prior to said clamping.

12. The method according to claim 1, wherein said plot of common illuminants comprises a multidimensional probability field, wherein said plot of common illuminants comprises at least one axis corresponding to a likelihood of an illuminant in a scene.

13. The method according to claim 1, wherein said color space is a red, green blue (RGB) color space.

14. The method according to claim 1, wherein said color space is a luminance chrominance color space.

15. A system for automatic white balancing for photography, said system comprising:
an image capture device comprising a lens, said image capture device configured to perform a method automatic light balancing, the method of automatic light balancing comprising:
accessing image data corresponding to an imaged scene, said image data comprising a plurality of pixels, said plurality of pixels comprising a plurality of color values corresponding to a plurality of color channels;
plotting said plurality of pixels in a color space comprising a plurality axes corresponding to said plurality of color channels;
aggregating, in said color space, a centroid from said plurality of pixels;
projecting, in said color space, said centroid to a plot of common illuminants;
deriving, on said plot of common illuminants, a set of balanced color values, said set of balanced color values comprising a plurality of color values corresponding to a closest approximation on said plot of common illuminants to said plurality of color values comprised by said centroid; and
adjusting said plurality of color values of said plurality of pixels by said set of balanced color values to arrive at a plurality of adjusted pixels,
wherein said plot of common illuminants comprises a plot of common illuminants specifically corresponding to an attribute of said captured scene.

16. The system according to claim 15, wherein said image data comprises a photograph.

17. The system according to claim 15, wherein said image data comprises an image from a video.

18. The system according to claim 15, wherein said plot of common illuminants comprises a plot of a plurality of common illuminants specific to a derived light intensity.

19. The system according to claim 15, wherein a pixel comprised in said plurality of pixels beyond pre-determined constraints is excluded from said aggregating.

20. A method for automatic white balancing for photography in an image capture device, the method comprising:
capturing a scene in an image capture device;
obtaining pixel data corresponding to said scene, said pixel data comprising a plurality of color values corresponding to a plurality of color channels and a light intensity;
determining said light intensity of said scene from said pixel data;
selecting a plot of common illuminants from a plurality of plots of common illuminants, said plot of common illuminants being selected to corresponding to said light intensity of said scene;
plotting said pixel data in a color space comprising a plurality of axes corresponding to said plurality of color channels;
aggregating a plurality of discrete data points comprised in said pixel data into a centroid;
projecting said centroid to said plot of common illuminants, wherein said projecting is performed by deriving a perpendicular line to a point on said plot of common illuminants;
deriving a balanced set of color values, said balanced set of color values comprising a plurality of color values corresponding to said point on said plot of common illuminants; and
adjusting said pixel data by said balanced set of color values to arrive at a plurality of digital pixels,
wherein said plot of common illuminants comprises a plot of common illuminants specifically corresponding to an attribute of said captured scene.

* * * * *